United States Patent [19]

Takemoto et al.

[11] Patent Number: 5,353,004
[45] Date of Patent: Oct. 4, 1994

[54] SENSOR FOR DETECTING STEERING ANGLE

[75] Inventors: Shuichi Takemoto; Yukihisa Oda, both of Chiryu; Akio Hashimoto, Anjo, all of Japan

[73] Assignee: Aisin Seiki Kabushiki Kaisha, Kariya, Japan

[21] Appl. No.: 784,993

[22] Filed: Oct. 30, 1991

[30] Foreign Application Priority Data

Oct. 31, 1990 [JP] Japan .............................. 2-115034[U]

[51] Int. Cl.$^5$ .................... H01C 13/00; H01C 10/16
[52] U.S. Cl. .................... 338/50; 338/132; 338/196; 338/171
[58] Field of Search ................ 338/50, 132, 153, 196, 338/171

[56] References Cited

U.S. PATENT DOCUMENTS 3,355,628 11/1967 Tronca ................... 338/132
4,966,041 10/1990 Miyazaki ................ 338/32 H

FOREIGN PATENT DOCUMENTS 60-56213 4/1985 Japan .
60-150407 10/1985 Japan .

Primary Examiner—Marvin M. Lateef
Attorney, Agent, or Firm—Burns, Doane, Swecker & Mathis

[57] ABSTRACT

During plural rotations of the the first potentiometer as a result of the operation of a steering wheel, though a specific position of the first potentiometer corresponds to plural rotation angles or rotation numbers of the steering wheel, the correct, real or current rotational angle or rotational number of the steering wheel can be obtained by knowing a one-to-one correspondence between a specific position of the second potentiometer and the reduced rotational angle of the steering wheel.

6 Claims, 3 Drawing Sheets

SENSOR FOR DETECTING STEERING ANGLE

BACKGROUND OF THE INVENTION

The present invention relates to a sensor for detecting a steering angle.

There has been provided a control system for adjusting the steering angle of each of a vehicle's rear road wheels depending on the steering angle of each of the front road wheels which are driven by a steering wheel. In this system, the detection of a rotation angle or a rotational number of the steering wheel should be established.

In light of the foregoing, Japanese Utility Model Registration Laid-Open Print No. 150407/60th year of Showa (1985), which was published in 1985 without examination, discloses a conventional structure for detecting the rotational angle of the steering wheel. In this structure, the steering wheel is operatively connected, via a reducer, to a rotary type potentiometer, from which the rotation angle can be obtained as a voltage change. It is set that the rotation angle and the voltage change have a one-to-one correspondence. Thus, the system can perform its function based on the resultant voltage change.

However, since the reducer per se has a defect in that there is an inherent backlash between two adjacent gears, the rotational angle of the steering wheel can't be transmitted to the potentiometer accurately, thereby preventing the reliable operation of the system.

SUMMARY OF THE INVENTION

It is, therefore, a principal object of the present invention to provide a sensor for detecting a steering angle without the foregoing drawbacks.

It is another object of the present invention to provide a sensor for detecting a steering angle with reliability.

In order to attain the foregoing objects, a sensor for detecting a steering angle in accordance with the present invention is comprised of a steering shaft to be rotated by a steering wheel, a shaft member operatively connected to the steering shaft so as to be rotated together with the steering shaft, a first potentiometer operatively connected to the shaft member and generating a first steering angle information in the form of a voltage which reverses direction plural times during rotation of the steering wheel and a second potentiometer operatively connected via a reducer to the shaft member for generating a second steering angle information which has a one-to-one correspondence to the rotational angle of the steering wheel.

DETAILED DESCRIPTION OF THE INVENTION

Figure 1:
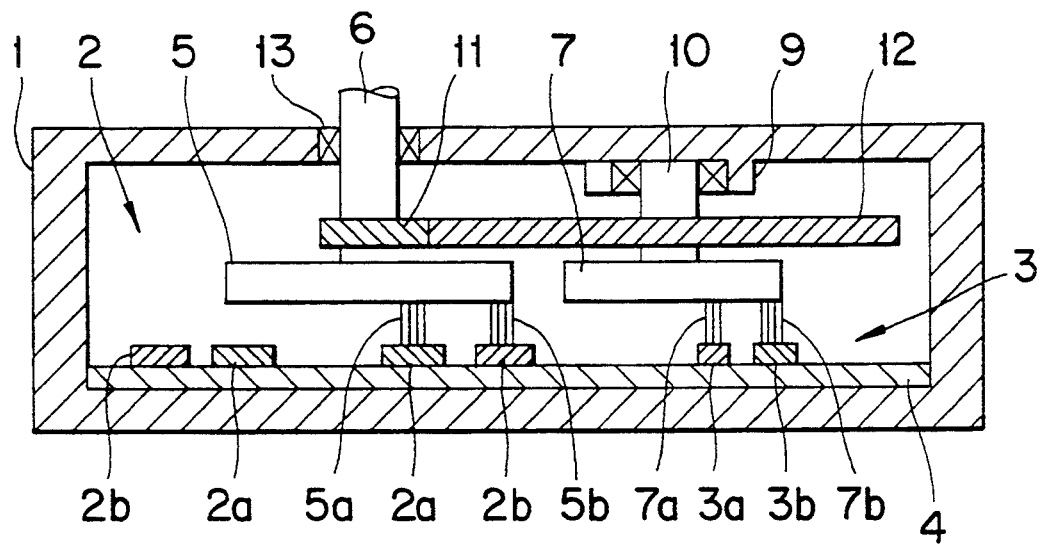
FIG. 1 is a cross sectional view of one embodiment of a sensor for detecting a steering angle according to the present invention.
Figure 2:
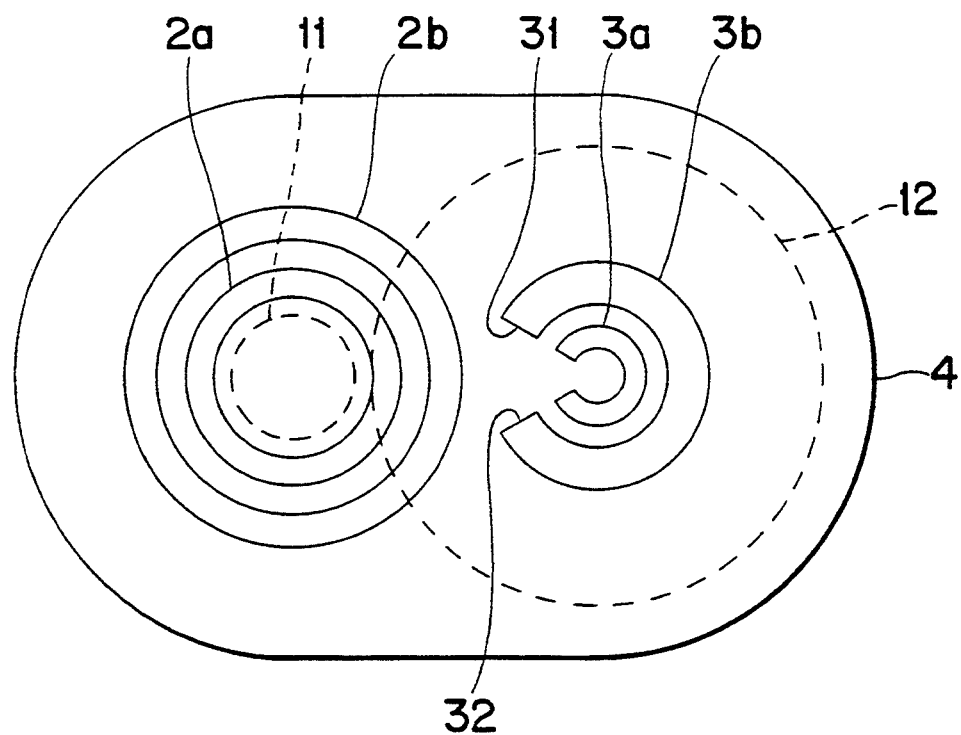
FIG. 2 is a plan view of a base plate on which potentiometers are formed.
Figure 3:
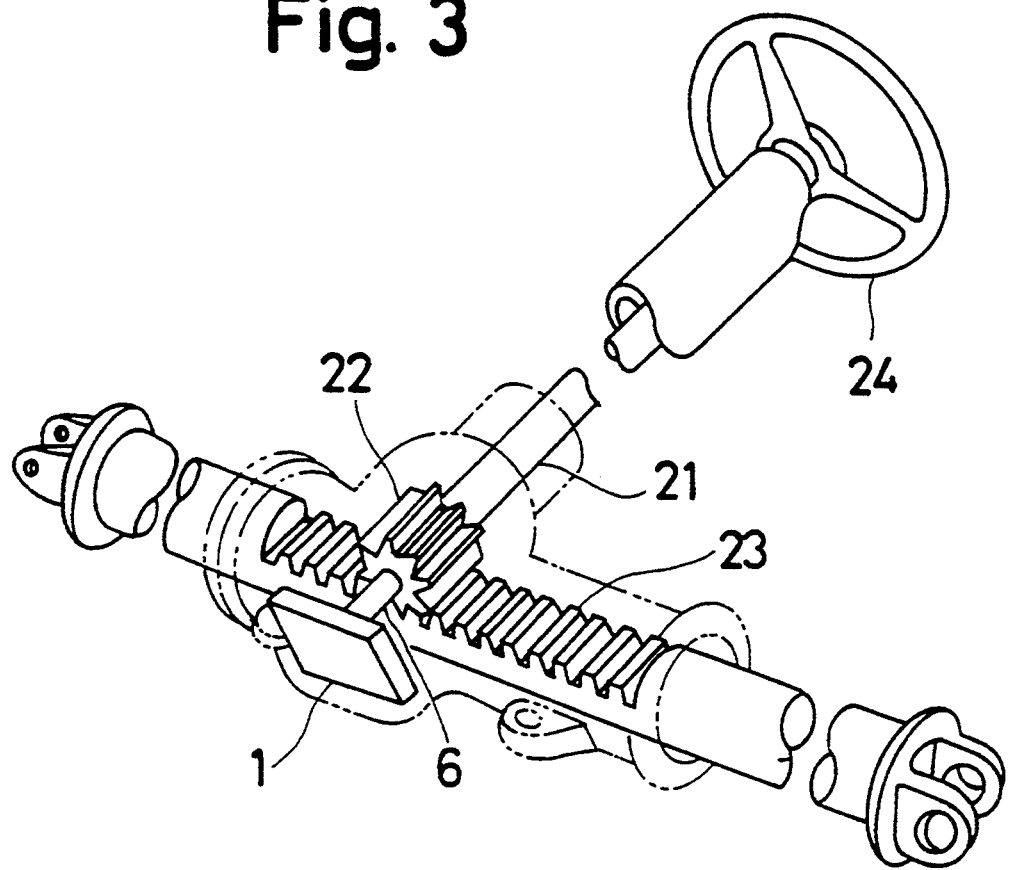
FIG. 3 is a perspective view of a steering mechanism to which is coupled a sensor for detecting a steering angle shown in FIG. 1.

Referring now to FIGS. 1 through 3, one embodiment of a sensor for detecting a steering angle according to the present invention includes a casing 1 in which is installed a base plate 4 made of an insulating material. On the base plate 4, there are provided a first potentiometer 2 and a second potentiometer 3.

The first potentiometer 2 includes, as shown in FIG. 2, an inner annular conductive member 2a, an outer annular resister member 2b which is coaxially arranged with the inner annular conductive member 2a at its inside, an inner brush 5a (FIG. 1) which is in slidable engagement with the inner annular conductive member 2a, an outer brush 5b (FIG. 1) which is in slidable engagement with the outer annular resister member 2b and a plate 5 to which the inner and outer brushes 5a and 5b are secured. The plate 5 is operatively connected to a steering wheel 24 (FIG. 3) which transmits its rotation via a large diameter gear 12, a small diameter gear 11 and a shaft member 6 which is rotatably supported by the housing 1 through a bearing 13.

The second potentiometer 3 has an inner conductive member 3a and an outer resistive member 3b each of which is in the form of arc-shaped configuration whose angle is less than 360 degrees. A plate 7 is provided with an inner brush 7a and an outer brush 7b which are in slidable engagement with the inner conductive member 3a and an outer resistive member 3b, respectively. The plate 7 is connected to a shaft member 10 rotatably fitted in a boss portion 9 of the housing 1 so as to be rotatable thereto.

The sensor for detecting a rotational angle of the steering wheel 24 which has the foregoing structure is set to be brought into association with a gear box at a distal end side of a steering shaft 21 which includes a pinion 22 and a rack 23. That is to say, the shaft member 6 as disclosed in FIG. 1 is directly coupled to the pinion 22.

In the foregoing steering mechanism, when the rotation of the steering shaft 21 as a result of the rotation of the steering wheel 24 rotates the pinion 22, the rack 23 which is in mesh engagement with the pinion 22 is then moved in the lateral direction of a vehicle body (not shown). Thus, the steering operation for front road wheels is established.

In the first potentiometer 2, the inner conductive member 2a is connected to the lowest point of the voltage or electric potential such as the earth or ground and a point of the outer resister member 2b is connected to a first reference voltage point such as a power supply, thereby generating a voltage difference between the outer brush 3b and the inner brush 3a as a first steering angle information.

On the other hand, in the second potentiometer 3, the inner conductive member 3a is connected to the lowest point of the voltage or electric potential such as the earth or ground and one end 32 and the other end 33 of the outer resister member 3b are connected to a second reference voltage point and a third reference voltage point, respectively. Each of the second reference voltage point and the third reference voltage point may be identical to or different from the first voltage point.

Figure 4A:
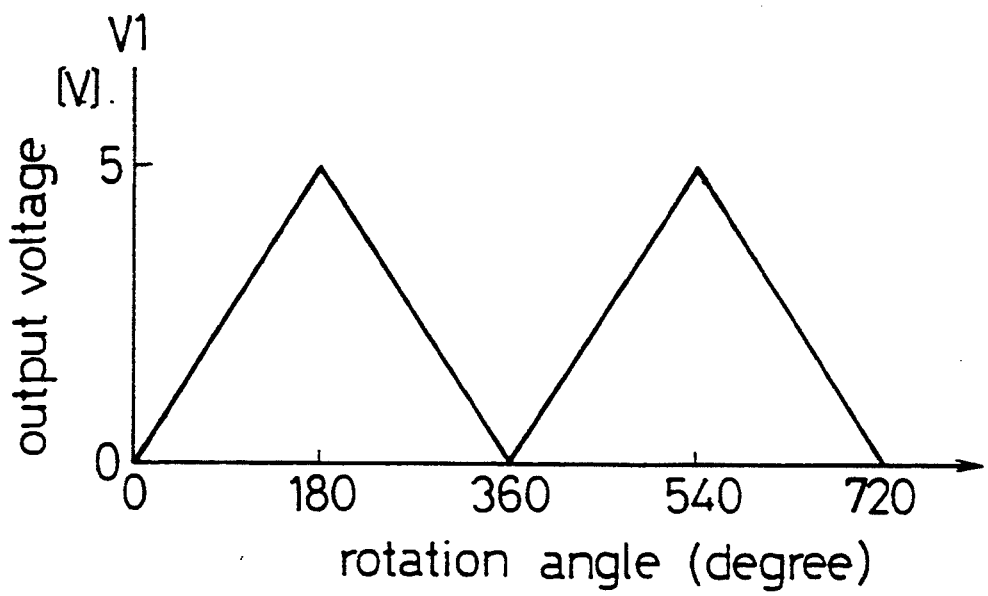
FIGS. 4a and 4b each shows a graph of the output voltage of each potentiometer.

The operation of both potentiometers 2 and 3 will be described hereinbelow in detail. It is noted that the steering wheel 24 can rotate 3.5 times. Thus, two rotations of the steering wheel 24 from a rest or initial point generate a voltage V1 as the first steering angle voltage between the inner and outer brushes 5a and 5b which traces the two reciprocations of a triangle wave shaped voltage as shown in FIG. 4(a) on the assumption that the voltage of the power supply is 5 volts. One side of the triangle shaped wave represents a voltage corresponding to a half rotation of the steering wheel 24 in light of the fact that the rotating angle of the shaft member 6 is directly detected which is directly connected to the steering wheel 24. Though the detected voltage V1 depends on the resolution of the outer resister member 2b, the outer resister member 2b which is provided for the multi-purpose use and which is available from the market is reliable, thereby detecting the steering angle correctly.

Figure 4B:
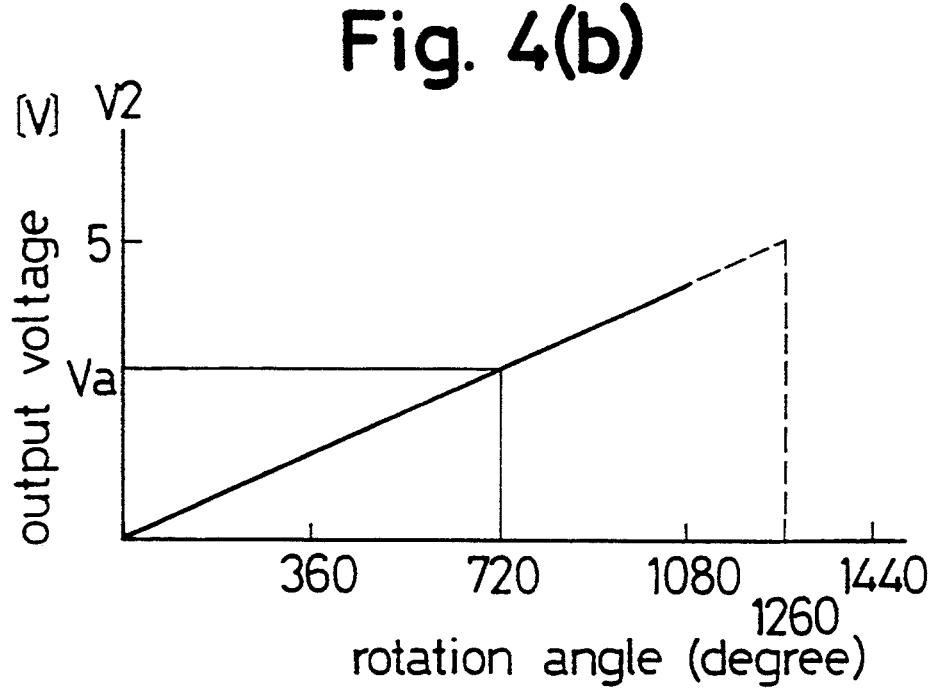

On the other hand, in the second potentiometer 3, the steering angle is detected by means of the reducer having large diameter and small diameter gears 11 and 12. The detected voltage V2 as the second steering angle information represents a linear function as shown in FIG. 4(b). That is to say, based on two rotations of the steering wheel 24, a voltage of Va less than 5 volts is detected and 3.5 rotations of the steering wheel 24 results in 5 volts, coinciding to the peak voltage in the first potentiometer 2. In other words, the full rotation of the steering wheel 24 is represented by 5 volts. This concept and the employment of a speed reducer having the gears 11 and 12 will generate an error in the detected voltage.

However, due to the fact that the detected voltage of the first potentiometer 2 is correct, the steering angle information obtained by the second potentiometer 3 is required only to specify one side of the triangle shaped wave. In other words, if the maximum steering angle of the steering wheel 24 is set to be 3.5 rotations, a voltage is only required to be detected which can distinguish a specific half rotation from the other half rotation.

As mentioned above, in this embodiment, though a specific position of the first potentiometer 2 corresponds to plural rotation angles or rotation numbers of the steering wheel 24, the correct, real or current rotational angle or rotational number of the steering wheel 24 can be obtained by knowing a one-to-one correspondence between a specific position of the second potentiometer 3 and the reduced rotational angle of the steering wheel 24.

Although only one embodiment of the present invention has been disclosed and described, it is apparent that other embodiments and modifications of the present invention is possible.

What is claimed is:

1. A sensor for detecting a steering angle comprising:
    a steering shaft to be rotated by a steering wheel;
    a first shaft member operatively connected to the steering shaft so as to be rotated together with the steering shaft;
    a first potentiometer operatively connected to the first shaft member for generating first steering angle information in the form of a voltage having one value plural times during rotation of the steering wheel;
    a second shaft member operatively connected via a reducer to the first shaft member; and
    a second potentiometer operatively connected to the second shaft member for generating second steering angle information which has a one-to-one correspondence with the rotational angle of the steering wheel.

2. A sensor according to claim 1, wherein the first potentiometer includes an annular conductive member, an annular resister member arranged coaxially with the annular conductive member and connected to a voltage source, a first plate to be rotated by the shaft member, a pair of brushes which are secured to the plate and which are sliding engagement with the annular conductive member and the annular resister member respectively so as to generate a voltage difference between the brushes.

3. A sensor according to claim 1, wherein the second potentiometer includes an arc-shaped conductive member, an arc-shaped resister member arranged coaxially with the arc-shaped conductive member and connected to a voltage source, a second plate coupled via the reducer to the shaft member, a pair of brushes which are secured to the second plate and which are in sliding engagement with the arc-shaped conductive member and the arc-shaped resister member respectively so as to generate a voltage difference between the brushes.

4. A sensor according to claim 3, wherein each of the arc-shaped conductive member and the arc-shaped resister member is formed so that its curvature is less than 360 degrees.

5. A sensor according to claim 2, wherein the reducer includes a small diameter gear driven by the first shaft member and a large diameter gear which is in meshing engagement with the small diameter gear.

6. A sensor for detecting an angle comprising:
    a shaft to be rotated;
    a first shaft member operatively connected to the shaft so as to be rotated together with the shaft;
    a first potentiometer operatively connected to the first shaft member and generating first angle information the form of a voltage having one value plural times during rotation of the shaft;
    a second shaft member operatively corrected via a reducer to the first shaft member; and
    a second potentiometer operatively connected via to the second shaft member for generating second angle information which has a one-to-one correspondence to the rotational angle of the shaft.

* * * * *